United States Patent [19]

Chann

[11] 3,727,857
[45] Apr. 17, 1973

[54] CONVERTIBLE FISHING REEL

[76] Inventor: George B. Chann, 160 Church Street, Bridgeton, N.J. 08302

[22] Filed: Sept. 28, 1971

[21] Appl. No.: 184,440

[52] U.S. Cl............242/84.2 B, 242/84.41, 242/215, 242/219
[51] Int. Cl. .......................A01k 89/02, A01k 89/04
[58] Field of Search .........................242/84.2 B, 215, 242/217, 219, 84.41

[56] References Cited

UNITED STATES PATENTS

| 3,215,360 | 11/1965 | Chambers | 242/215 |
| 3,250,489 | 5/1966 | Hiromitsu | 242/215 |
| 2,633,307 | 3/1953 | Morgan et al. | 242/84.2 B |
| 2,581,306 | 1/1952 | Slotterback | 242/84.2 B |

*Primary Examiner*—Billy S. Taylor
*Attorney*—Martha G. Pugh

[57] ABSTRACT

A two-way reversible spool fishing reel for spin casting, spool casting or spool winding. A star drag clutch provides for star drag or free spool operation; and a handle adjustment provides spool winding at two different speeds. A swivel mechanism connected to the shank of the rod support permits the position of the reel to be shifted with its axis parallel to the rod for spin casting, or normal to the rod at diametrically opposite positions for right-handed or left-handed spool casting or spool winding. A ratchet projections depending from the swivel mechanism locks against rotation of the shaft during spin casting, and presents a tapered face for ratchet action when the reel is shifted to right-handed or left-handed winding positions. The ratchet may be lifted to off position, or readily reversed to provide a noise maker. The crank handle is constructed with a slidable adjustment for keying a shift to high or low speed spool winding or free crank positions.

11 Claims, 11 Drawing Figures

INVENTOR
GEORGE B. CHANN
BY Martha H Pugh
ATTORNEY

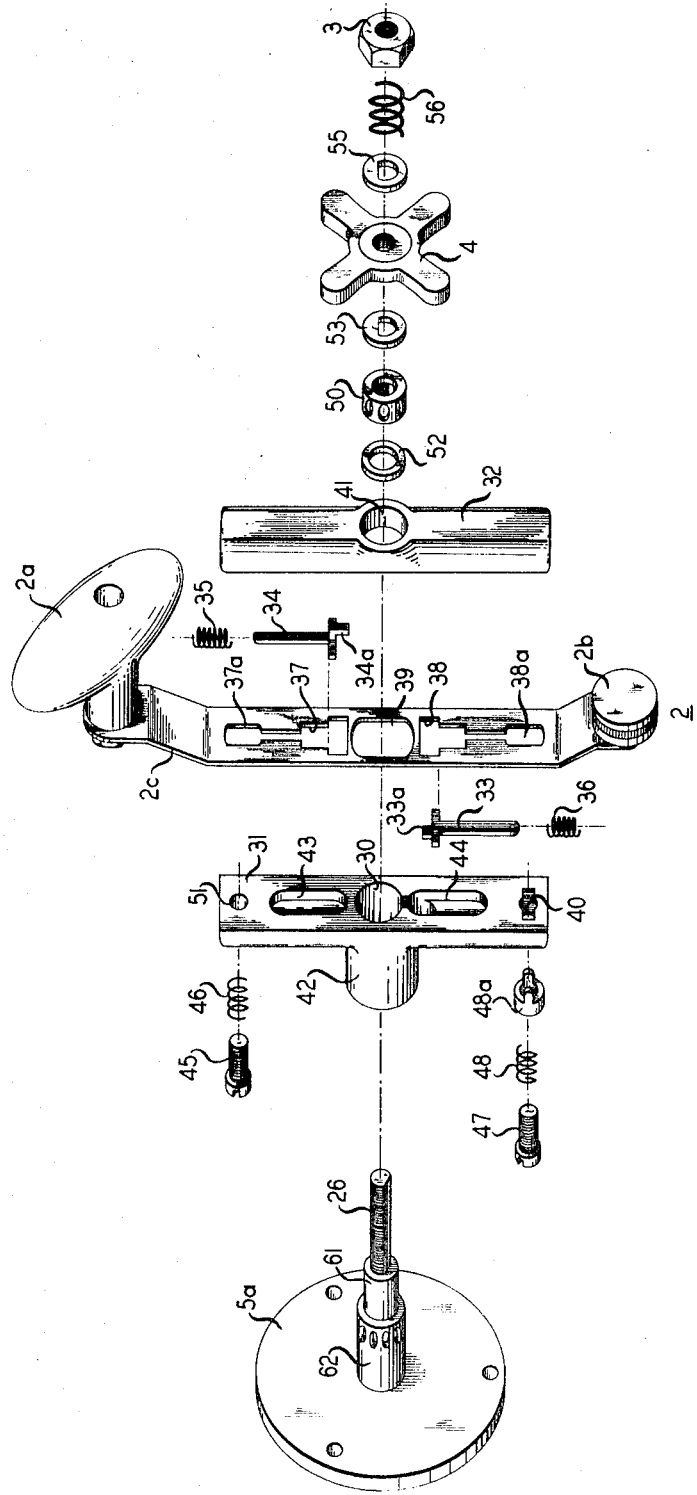
FIG. 3A
FIG. 5B

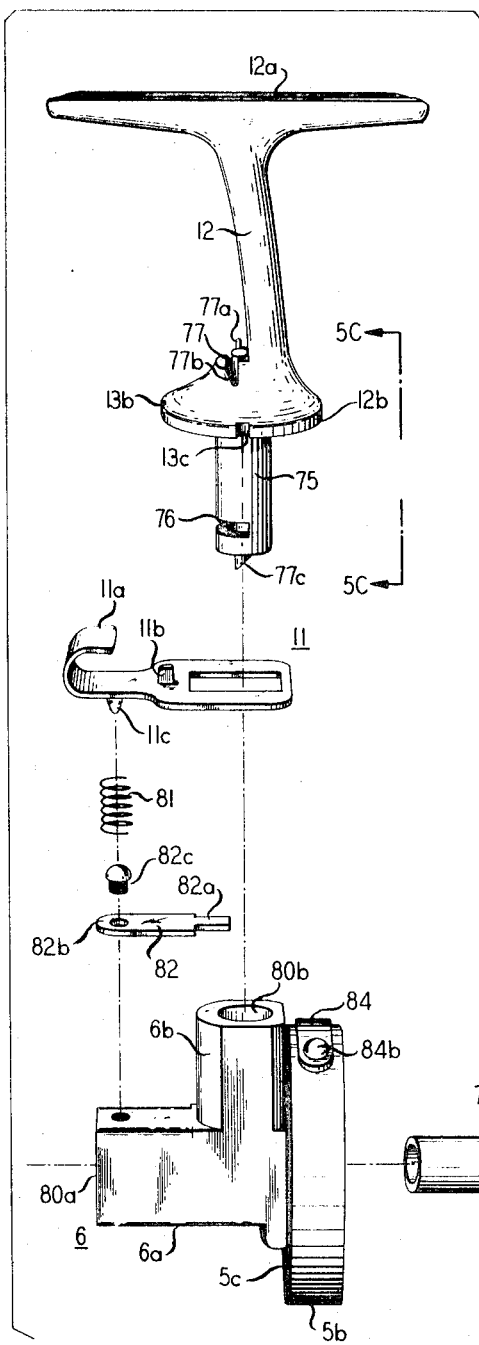

CONVERTIBLE FISHING REEL

BACKGROUND OF THE INVENTION

This relates in general to fishing reels, and more particularly, to a reversible reel which combines a plurality of functions, including spin casting and spool casting with right-handed and left-handed spool winding operations.

Using prior art equipment, a fisherman needs two different types of reels, one for spin casting and one for spool casting or spool winding. The line often becomes twisted and tangled during casting. Moreover, prior art mechanisms for adjusting the direction and rate of spool winding, for supplying a drag to the line, are often clumsy and cumbersome, and involve complex gearing and clutching mechanisms.

Accordingly, it is the principal object of the present invention to provide an improved combination fishing reel, suitable for spin casting, spool casting or spool winding, which is readily adjustable for different winding rates and directions, for free spool or star drag, with a minimum of manipulation. Another object of the invention is to avoid twisting of the line which may result during casting. Another object is to provide a reel with an efficient driving mechanism, rotatable in one direction only, and having simple gearing including only a few moving parts. Another object of the invention is to provide a reel with a readily removable or reversible spool.

SUMMARY OF THE INVENTION

These and other objects are realized in a two-way reversible fishing reel in accordance with the present invention which is designed to be alternatively employed for spin casting, right-handed or left-handed spool casting or spool winding at two different speeds. A star drag nut acts as a friction clutch for adjustment between free spool and gear operation, as well as a means for applying tension to the line.

A principal feature of the invention is swivel means for rotating the reel, including its drive shafts, about a supporting shank which is connected to the reel foot in such a way that the reel may be locked into one of three positions. In the first position, which is suitable for spin casting, the spool axis is disposed parallel to the length of the rod. In the other two diametrically opposite positions for right-handed or left-handed spool casting or spool winding, the axis of the spool is disposed normal to the length of the rod. The spindle drive shaft, which is coupled to the spool, is enclosed along a portion of its length by a hollow drive shaft which contains driving means to which the spindle is adapted to be frictionally coupled by the star drag nut. The hollow drive shaft includes a series of rectangular slots around its circumference. A ratchet head on the supporting shank is positioned to key into these slots. In the spin casting position the ratchet head acts as a detent to prevent rotation of the hollow drive shaft and the spindle shaft to which it is frictionally coupled. In the left-handed and right-handed spool winding positions, the ratchet head presents an inclined face to the slots in the hollow shaft, in succession, to permit its rotation and that of the frictionally coupled spindle shaft in one direction only. The ratchet head may be lifted up verTically, enabling it to be disconnected or reversed to provide a noise maker. For the winding operation, the crank may be either coupled directly to the hollow drive shaft for high speed operation, or to the spindle shaft for low speed. The shift from high to low speed is achieved by the sliding action of the crank handle.

Particular features of the invention include the following. It is designed to operate for right-handed or left-handed spool or bait casting with a left-handed or right-handed straight spool wind. It functions as a spin casting reel with a straight spool wind. One can spin cast alternately, with a right-handed cork screw, and then a left-handed cork screw, thereby avoiding twisting of the line. By depressing a spring-loaded keying mechanism, the spool is readily removable from the reel and reversed. The ratchet mechanism may be readily shifted to right, left or off position, or reversed to provide a noise maker. A quick-change control device is provided in the crank handle for shifting from high to low speed winding operation, and vice versa, without change in gears. The gearing is so arranged that each turn of the crank provides one free turn of the spool above the gear ratio, thereby reducing the required gear ration to give a desired speed of rotation. Both spool drag and free spool operations are provided in one device. The spool and its entire driving mechanism, including the level wind, drive shaft, gears and crank, are all designed to rotate in one direction, in one bearing, making for easy winding of the reel.

Other objects, features and advantages of the invention will be better understood from a study of the specification hereinafter with reference to the attached drawings.

SHORT DESCRIPTION OF THE DRAWINGS

FIG. 3A is an exploded view, in perspective, of the crank handle of FIGS. 1 and 2, disassembled to show the component parts in relation to the end plate of the cylindrical reel frame;

FIG. 3B is a perspective showing of the handle of FIG. 3A, partially reassembled with the left face plate in place, showing the positions of the upper and lower spring-biased members which are alternatively actuated to engage the drive shafts to operate the reel at high or low speed;

FIG. 5A is an exploded view of the main assembly of the reel of FIGS. 1 and 2 with the spindle shaft and cylindrical gear box removed. This shows the spring-biased ratchet head depending from the supporting shank, oriented to engage the slots in the hollow drive shaft as a detent or ratchet;

FIG. 5B shows the spindle drive shaft removed from the reel assemblage;

DETAILED DESCRIPTION

Figure 1:
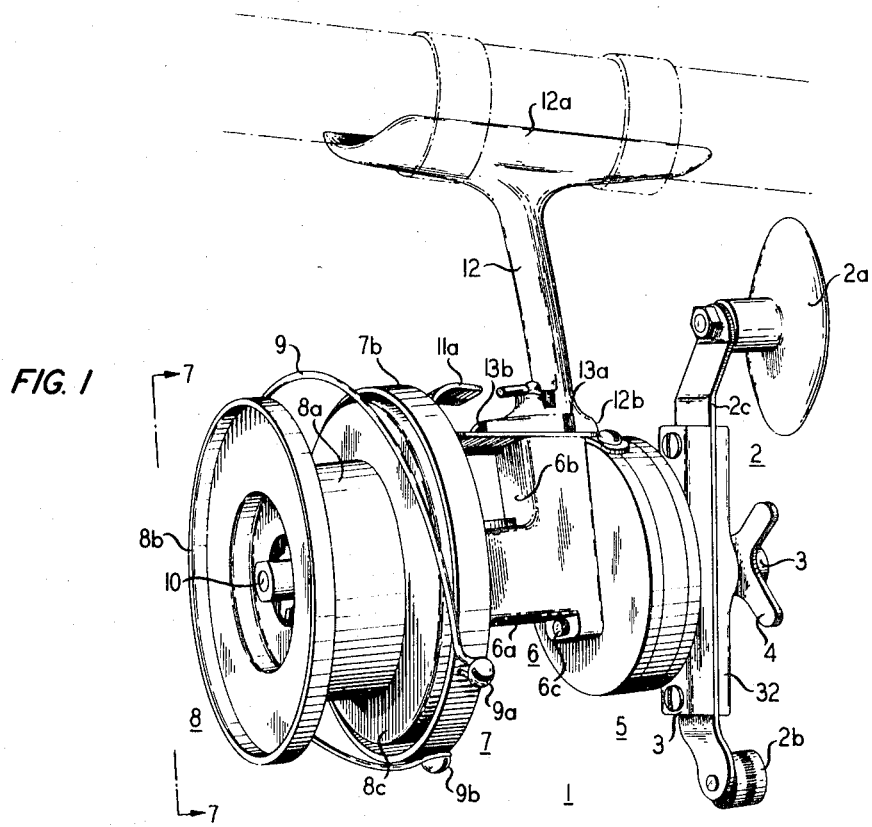
FIG. 1 is a perspective showing of the two-way reel of my invention in position for spin casting.
Figure 2:
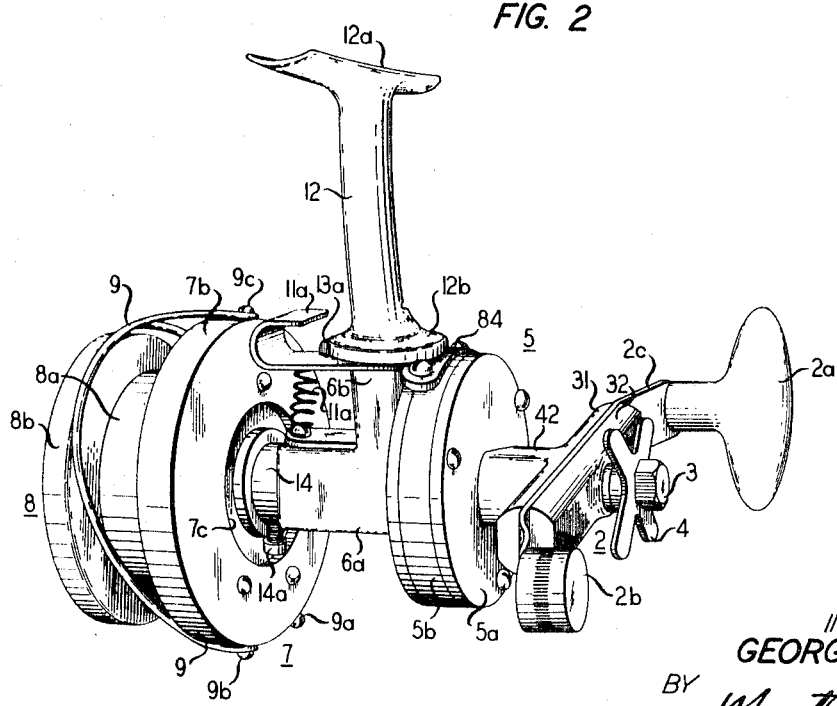
FIG. 2 is a perspective showing of the two-way reel of my invention in spool casting or reeling position.

FIGS. 1 and 2 of the drawings give an external view of the reel of the present invention, which will now be described, prior to a description of its internal working parts. At the right-hand end of the overall reel assemblage 1, is the crank assemblage 2, which is shown in upright position in FIG. 1, and has been rotated through 90° in FIG. 2. The crank assemblage 2 is equipped at its ends with conventional handles 2a and 2b which may be single or double, of any type desired. Crank 2 is constructed to be coupled internally in driving relation to a system including the spindle drive shaft (to be shown and described hereinafter), which extends in axial relation to the entire reel assembly from the nut 3 at the right-hand end, to the nut 10 at the left-hand end. In the embodiment shown, the crank handle 2c is a flat metal shaft, the two ends of which are slightly bent towards the handles. The flat portion of the crank handle 2c, which is sandwiched between a pair of face plates 31 and 32, is designed to be moved longitudinally relative to the face plates by grasping the handles 2a, 2b, causing it to slide. This operation causes a shift in the rate of spool rotation from high to low speed, or vice versa, with an intermediate free crank position, in a manner which will be described in detail hereinafter with reference to FIGS. 3A, 3B, 3C and FIG. 4, which show the handle and gear assemblies disassembled to reveal the driving mechanism.

The spring-loaded nut 3 is screwed onto the end of the spindle shaft to retain drag nut 4 in position to be moved manually therealong. The star drag 4, as will be better understood from the description hereinafter, acts as a frictional clutch on the shaft, to change from free spool to gear operation, or to increase the tension on the line. The two principal driving gears, to be described, are housed in a cylindrical gear box 5, the right-hand face or dust cover of which is pressed in concentric relation against the hub 42 of the face plate 31 of the handle assemblage. The left-hand face of gear box 5 is pressed in axial relation against the centrally disposed L-shaped shaft housing 6. The latter, which takes the form of a right-angle elbow pipe, is substantially rectangular in external cross-section. Leg 6a, which extends to the left in an axial direction, is slightly rounded at the top, and serves to enclose the hollow drive shaft, surrounding the spindle drive shaft, as indicated in the exploded drawing of the main assembly in FIG. 5. The housing 6 is fastened to the left-hand face of gear box 5. Housing leg 6b, which extends above the upper surface of housing leg 6a, adjacent the inner face of gear box 5, encloses the ratchet head or detent mechanism which is adapted for coupling in one of three different positions to the hollow drive shaft, as will be shown and described in detail with reference to FIG. 5 of the drawings. The ratchet head or detent mechanism depends from the lower end of the supporting shank 12 which broadens at its base into a circular flange 12b, resting on top of housing leg 6b, which is rotatable relative to the shank. It will be apparent that the separate housings 5 and 6 can be formed in a single integral unit.

Rigidly fixed at right angles to the upper end of shank 12 is the reel foot 12a which is slightly curved in a lengthwise direction to fit the contour of the fishing pole. Shank 12 serves as an axis for rotation of the reel in a horizontal plane to each of three different positions represented by engagement of notches 13a, 13b or 13c (not shown) in flange 12b, with nub 11b on the spring-loaded swivel lock 11. In the intermediate position 13b, the axis of the reel is parallel to the principal axis of the fishing rod for spin casting, as shown in FIG. 1. The two other reel positions are represented by notches 13a and 13c located 180° apart for spool casting or right-handed or left-handed reel winding operations, in which the axis of the reel is normal to the fishing rod, as shown in FIG. 2.

Figure 6:
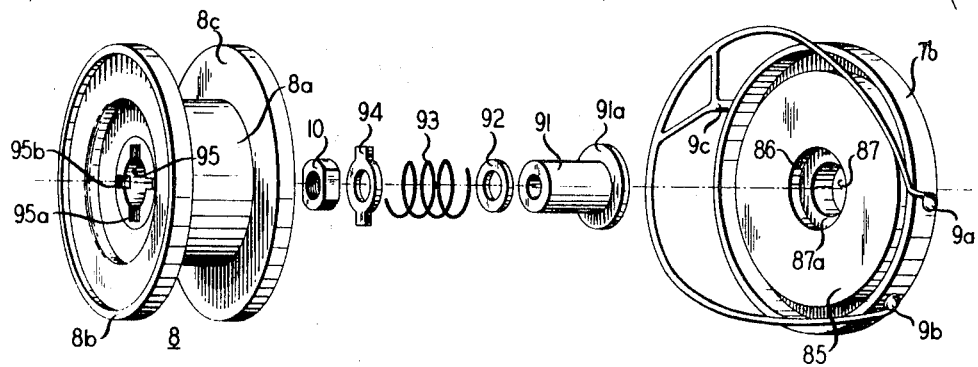
FIG. 6 shows the spool and spindle assembly, and the level wind of FIGS. 1 and 2, disassembled.

Attached to the left-hand end of the assemblage is a cylindrical level wind mechanism 7. This comprises an annular back plate which has a central opening 7c and a circular peripheral cup-like flange 7b, extending outwardly normal to and integral with the back plate. Mounted in axial position in the central opening 7c is an inwardly projecting hub 14, which is adjacent the lateral leg 6a of the central housing 6. This serves to enclose the hollow drive shaft, to which it is coupled by set screw 14a, as will be described in detail with reference to FIGS. 6 and 7 of the drawings. A taper cam wire 9, having its terminals connected at screws 9a, 9b and 9c on the flange 7a, serves to guide the fishing line as it is wound on the spool 8. The latter, which is shown disassembled in FIG. 6, is a conventional spool, having a central drum 8a, disposed between a pair of protective flanges 8a, 8b, on which is wound the fishing line. The spool 8 is constructed to be reversibly secured by a readily releasable spring-loaded lock, terminating in lock washer 94 and nut 10, to a spindle which rotates at the center of the cup-like flange 7b of level wind mechanism 7. The spindle is mounted in driven relation to the spindle drive shaft which passes axially through the reel, as will be described in detail with reference to FIG. 6.

The various parts of the reel will now be described in disassembled form to more clearly indicate their inner workings.

We will now refer to FIG. 3A of the drawings which shows a disassembled view of the handle assembly 2. Referring now to the body of handle 2, this comprises the right-hand face plate 32 and the left-hand face plate 31, which have been removed from the respective faces of handle shaft 2c and opened up to show their operating parts.

The crank handle shaft 2c is an elongated flat metal plate, the upper and lower ends of which may be bent outwardly at a slight angle with respect to the central portion for easy grasping, as indicated in FIG. 1 or FIG. 3A, although it will be understood that the handle can be straight. Fixed to each of the respective ends is a handle 2a or 2b. The handles (either one, or two) may assume any of the forms usual in the art, identical or not, and are secured to the ends of the crank by the usual means, such as nuts and bolt or rivets. The right-hand (outside) face plate 32, which substantially matches in shape the flat portion of shaft 2c, has a lightly rounded cross-sectional contour. The left-hand (inside) face plate 31, which is similarly shaped, also has a rounded cross-sectional contour. In FIG. 3A these face plates have been removed from the face of the crank handle 2c, to show the forms in the latter of the upper slot 37, the central slot 39 and lower slot 38. The slots have been machined in the crank handle to respectively accommodate an upper detent member or dog 34, loaded with the spring 35 and the lower detent member or dog 33, loaded with the spring 36. Matching upper and lower slots 43 and 44 which accommodate detent members 34 and 33 and their respective projecting fingers 34a and 33a, have been machined on the inside face of left-hand face plate 31, and also, of right-hand face plate 32, although the latter are not shown. Left-hand face plate 31 has a central opening 30, and right-hand face plate 32 has a central opening 41. These openings, together with opening 39, which is elliptical, accommodate the spindle drive shaft 26. The face plate 31 has, in addition, in axial position, an inwardly projecting hub 42, slightly flattened on one side, which is adapted to enclose, in concentric relation, the slotted hollow drive shaft 62 which protrudes through a central opening in the right-hand end plate or dust cover 5a of the central gear box. Slotted hollow drive shaft 62 and the cylindrical spacer 61, which takes the form of a sleeve fitting concentrically between the shaft 26 and the inside bore of hollow shaft 62, will be described in greater detail with reference to FIG. 4.

Upon being partly reassembled, as shown in FIG. 3B, face plate 31 is held in place against handle plate 2c by a pair of screws 45 and 47 which are respectively pressure loaded by springs 46 and 48 to pass through the respective screw holes 51 and 40 (FIG. 3A), passing through the elongated upper opening 37a, and corresponding lower opening 38a to similarly placed screw holes (not shown) on the inside face of plate 32. The openings in plate 2c are shaped to permit it to move slidably in a vertical direction (as shown in FIG. 3A) with respect to the face plates 31 and 32. Crank handle 2c, as shown partially reassembled, includes the detent member 33 and the loading spring 36 in the lower slot 38, and the upper detent 34 and the loading spring 35 in the upper slot 37. When crank shaft 2c is moved vertically to the lowermost position with reference to face plate 31 (and 32 when in place), detent finger 34a protrudes into cavity 39; and when shaft 2c has been moved vertically to its uppermost position, detent finger 33a (not shown) protrudes from the opposite direction into cavity 39. At an intermediate position, neither detent protrudes into cavity 39.

Figure 3C:
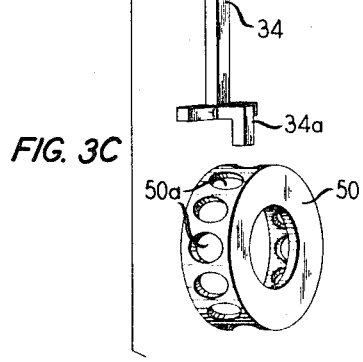
FIG. 3C is a detail of a slotted collar and an engaging member.

FIG. 3C shows, in enlarged detail, the form of the member 34 (which is substantially similar to the member 33) and its relation to the slots in collar 50, which are similar to the slots in hollow drive shaft 62. It will be noted that the finger 34a extends downwardly from a cross-piece on which spring 35 bears. The finger 34a is constructed so that when the member 34 is thrust downwardly by the action of spring 35 it engages one of slots 50a of the slotted collar 50, assembled on the spindle shaft 26 in concentric relation to internal sleeve 61 to be frictionally engaged for rotation with pinion 65, in a manner to be described. Likewise, in the case of member 33, which extends upwardly in a diametrically opposite (but off-set) direction with respect to the member 34, finger 33a is constructed to operate under compression of spring 36 to engage with the slots 62a of slotted hollow shaft 62 which is assembled to rotate concentrically with, but independently of, spindle shaft 26, as will be described.

At the right-hand end of FIG. 3A is shown the star drag assemblage which is screwed onto the right-hand end of the spindle shaft 26 after the latter is threaded through the opening 39 of the crank handle 2c, and matching openings 30 and 41 in face plates 31 and 32. The star drag and crank handle assemblage includes, from left to right in the order in which the elements are screwed onto the drive shaft 26, the following. The slotted collar 50, which is designed with an outer diameter equal to that of the hollow shaft 62, has an inner bore at the left-hand end designed to fit over spacer 61, the right-hand end of the inner bore being stepped back to a smaller diameter to provide an internal shoulder. This shoulder bears in frictional contact against the end of internal sleeve spacer 61 when sufficient pressure is applied. Collar 50 has machined around its periphery a uniformly spaced series of either slots 50a which, as previously indicated, are constructed to engage the finger 34a of the member 34. This operation meshes the shaft 26 to the crank.

The spacer 52, which is the same outer and inner diameter as collar 50, prevents end play on the crank. Ring 53 is a lock washer, flattened on one side of the inner bore to coincide with the flattened end of spindle shaft 26. Washer 53 fits between drag nut 4 and collar 50. The star drag nut 4 is screw-threaded to accommodate the screw-threaded end of spindle shaft 26. The left-hand face of star drag nut 4 has a slightly raised annular surface at the center, whereas its right-hand face has an annular recessed area. On the right-hand end of spindle shaft 26 is a lock washer 55 which is held in place by a spring-loaded nut 3. This combination serves to maintain star drag nut 4 in place on the shaft, regardless of whether it is tightened for spool drag or loosened for free spool operation.

When the star drag nut 4 is tightened, it presses against the washers 53 and 52, which bear against the face of slotted collar 50, the shoulder of which, in turn, bears against the end of internal sleeve 61 so that the latter exerts a frictional clutching action coupling it for rotation to pinion 65 through the flange of a matching internal sleeve 68, as will be described with reference to FIG. 4. If it is desired for the spindle shaft 26 to move freely, disengaged from the system of gears, the drag nut 4 may be slightly unscrewed so as to release the frictional coupling just described.

Figure 4:
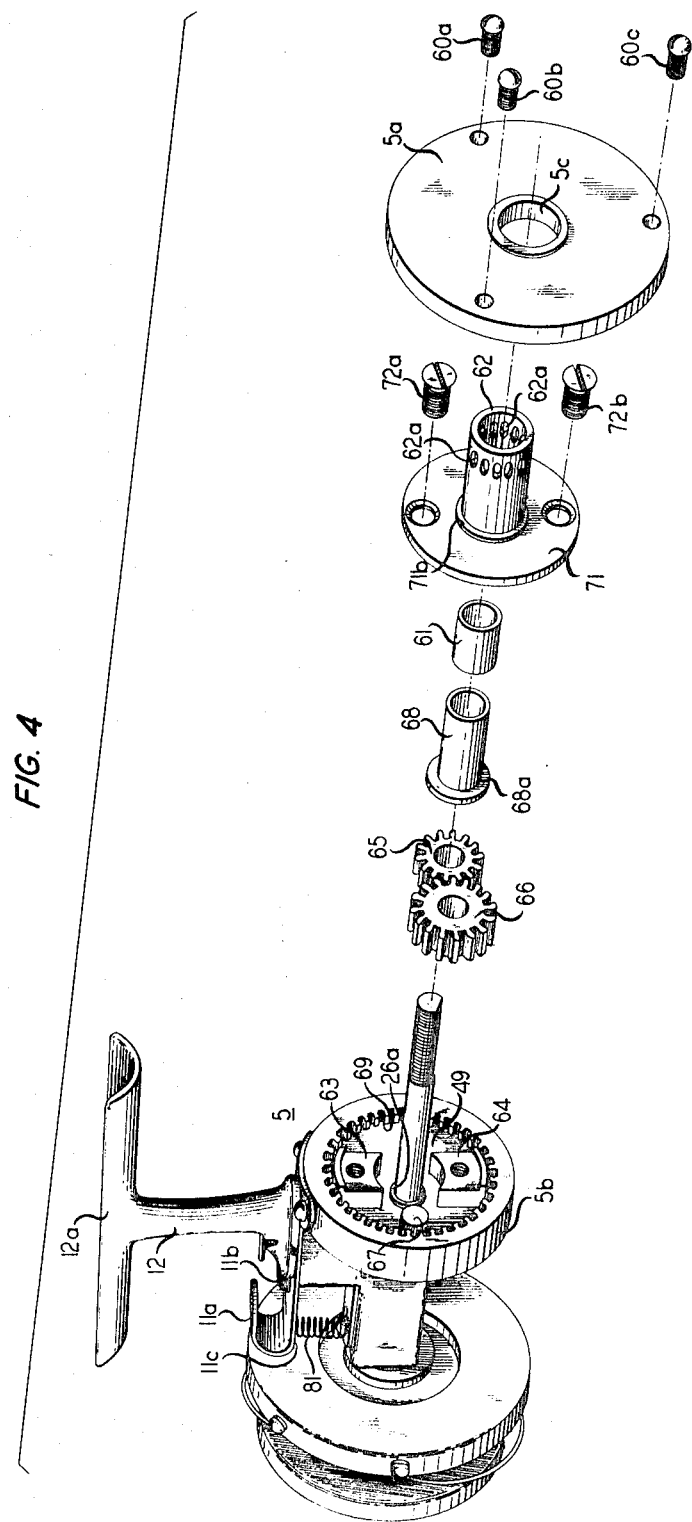
FIG. 4 is an exploded view of a partial combination of FIGS. 1 and 2 with the dust cover removed to show the gear box and its contents disassembled.

Referring now to FIG. 4, which shows the disassembled gear assembly, the circular plate or dust cover 5a is removed from the gear box 5b by disengaging three screws 60a, 60b and 60c, which fit into screw holes at symmetrically spaced positions near the periphery. The inside face of cover 5a is recessed and has a central opening for accommodating the spindle shaft 26 and the hollow drive shaft assembly, as will be described.

The gear box 5b, which has the same outer diameter as the circular cover 5a, is a cylindrical shell, housing a stationary ring gear 69, which in the present illustrative embodiment has 48 teeth. Cooperating the ring gear 69 is a small idler gear 66 which has 15 peripheral teeth, and is disposed to move around the inside of and engage the teeth of ring gear 69. Idler 66 is rotatably mounted on an eccentric stud 67 which is rigidly mounted to an annular plate 49 resting rotatably on the bottom of gear box 5b. Plates 49 and 71 connect together, as will be shown presently, to form a secondary gear box, housing gears 65 and 66 between them. Cooperating with idler gear 66, small pinion gear 68, having 18 teeth, is rotatably mounted concentrically on axis 26. The upper surface of pinion gear 65 is flat, having a central opening dimensioned to accommodate spindle shaft 26. The lower or inside surface of gear 65 has an annular recess which fits over and bears against the shoulder of a lock washer 26a which is rigidly fixed in place on shaft 26 (see FIG. 5B). Spindle shaft 26, together with rigidly mounted lock washer (or clip) 26a, is constructed to rotate relative to the inside face of the rotatable disk 49. Lock washer 26a serves to control the end play for spindle shaft 26, and functions to provide spool drag when drag nut 4 is tightened. Spindle shaft 26 is shown in toto, removed from reel, in FIG. 5B. The right-hand end extends only a little over half the length from lock nut 26a at the left-hand end. The two ends are screw-threaded and flattened.

On the right-hand face of rotatable plate 49, in diametrically opposite positions above and below the principal axis 26, are located a pair of bosses 63 and 64, which serve to fasten plates 49 and 71 together. These are curved on their edge faces to provide clearance to accommodate pinion gear 65 in an axial position in positive engagement with the teeth of idler 66, which is simultaneously intermeshed with the teeth of ring gear 69. The internal pressure sleeve 68, which terminates in a narrow flange 68a, is fitted over spindle shaft 26 so that flange 68a bears in frictional coupling relationship against the face of pinion gear 65 whenever the star drag nut 4 is tightened.

Adjacent the right-hand end of internal sleeve 68 is internal sleeve spacer 61 of substantially the same inner and outer diameters as the latter. Formed integrally with plate 71 and protruding from the center of its right-hand face, is the hollow drive shaft 62, which is surrounded at its base on the right-hand face with a slightly raised annulus 71b. The plate 71 and projecting hollow drive shaft 62 are constructed to fit in concentric relationship over the sleeves 68 and spacer 61, so that the latter protrudes at the right-hand end, as shown in FIG. 3A. Near the right-hand end of hollow drive shaft 62 is a series of uniformly spaced slots 62a which serve for engagement with finger 33a of the spring-loaded member (or dog) 33, described hereinbefore with reference to the handle assembly, FIG. 3A. When the plate 71 is rigidly secured to the bosses 63 and 64 by screws 72a and 72b in concentric relation with plate 49, they together form a secondary gear housing which rotates in unison with the rotation of hollow shaft 62, while idler gear 66 traverses the inside of ring gear 69. When the dust plate 5a is assembled to the gear box 5b, the hollow drive shaft 62 protrudes through the opening 5d at the center of dust plate 5a.

It will be apparent that in accordance with the gear ratio of the present embodiment, pinion gear 65 will undergo three complete rotations for each complete cycle of the idler gear 66 around the interior of ring gear 69. At high speed, the whole gear assemblage undergoes one rotation in addition to the three-to-one indicated by the gear ratio.

Also, it will be understood that the single idler gear 66, which meshes with the teeth of ring gear 69 and pinion gear 65, may be replaced with a plurality of gears for increased power. Other gear arrangements, well known in the art, may be employed to provide the same or different gear ratios.

Referring now to the main assembly, an exploded view of which is indicated in FIG. 5A of the drawings, which is located adjacent to and to the left of the principal gear box 5b, there is shown the left-hand face of rotatable plate 49, removed from the bottom of gear box 5b, eccentric pin 67 protruding to the right. Integrally formed with the left-handed face of the latter is a hollow drive shaft 73 which protrudes to the left. The central bore (not shown) is constructed to accommodate the spindle shaft 26.

Hollow drive shaft 73, which fits concentrically around spindle shaft 26, has a series of four lateral, rectangular slots 73a machined around its periphery and centered on a circle spaced from the left-hand face of the plate 49. It will be apparent that when the gears 65 and 66 are assembled in the secondary gear box comprising plates 49 and 71, which are fastened together through bosses 63 and 64, the whole, including the hollow shafts 62 and 73, rotates in one direction only, as a single drive shaft assemblage.

The partially flattened reel supporting shank 12, as previously described, terminates in a reel foot 12a of longitudinally curved contour which serves as a base for binding the reel to the fishing pole. Shank 12 has at its lower end an expanded base portion 12b, which has a smooth annular under face, surrounding at its center a circular recess in which the top of housing 6b is seated for rotation of the reel in a horizontal plane about shank 12. The housing 6b is slightly rounded on one side so that it fits snugly into the circular recess in the base 12b, in a manner that permits the rotation of the housing relative to the base. When the base member 12b is assembled on the housing 6b, the lip slightly overlaps the strap 84 (see FIG. 2) which is fastened to the top of the gear housing 5 by two screws 84a (not shown) and 84b. Strap 84 functions as a pressure plate for the swivel lock 11 about to be described, preventing side play.

The base 12b has three notches, as previously pointed out, 13a (not shown), 13b and 13c, which are located at intervals of 90°. Each of these is designed to engage a button 11b of the swivel lock 11 to hold the reel at a desired angular position relative to the supporting shank 12. A cylindrical member 75 is centered on and extends downward from the recessed underface of the base 12b. A semicircular notch 76 is cut into the curved wall of the cylindrical member 75 just above the bottom, meshing with finger 82a to keep the reel from turning through more than 180°, as will be described.

Housing leg 6a has a central bore 80a which extends laterally from right to left to accommodate spindle shaft 26 and the hollow drive shaft 73. (See sectional FIG. 7). Extending upwardly in leg 6b at right angles to bore 80a is a central bore 80b, of the same diameter for accommodating the cylindrical member 75.

Surrounding the upper end of the housing leg 6b, and spring-loaded to bear against the annular bottom edge of the base 12a, is a swivel lock 11 comprising a collar having a rectangular internal opening dimensioned to rest on top of the leg 6b surrounding cylindrical member 75. This collar extends outwardly at one end to form a projection, which is curved backward in the form of a flat thumb rest 11a. Located below the thumb rest 11a, and positioned to engage one of notches 13a, 13b or 13c in the base 12b, is a small nub 11b, which is shaped to fit slidably into the appropriate notch. On the lower face of the projecting portion of swivel lock 11 is another nub 11c, which is mounted to engage the upper end of a small coil spring 81, which can be capsule covered. The lower end of the latter is fastened to one end of an elongated metal platelet 82 by a screw 82c secured in screw hole 82b. Platelet 82 has at the other end from the spring connection a small finger 82a, which projects into an opening at the base of leg 6b and rides in the semicircular notch 76 as the base 12a is rotated to its different positions 13a, 13b or 13c. In addition to acting as a stop for the swivel action about shank 12, platelet 82 serves to lock the supporting shank 12 and the housing 6 together. The nub 11 is held in engagement with the selected notch by the compression of spring 81 until released by depression of the thumb rest 11a.

Figure 5C:
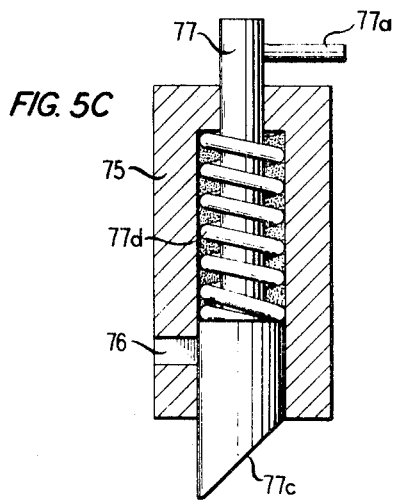
FIG. 5C is a section as indicated by the arrows 5c on FIG. 5A, showing the spring-loaded ratchet head.

FIG. 5C is an enlarged cross-sectional showing of the cylindrical element 75 which includes a longitudinal bore in which is slidably mounted a spring-loaded cylindrical pin 77 which just fits in the shaft except for a recess for spring 77d. The upper end of spring-loaded pin 77 terminates in a control handle 77a which is designed to move up and down in a lateral slot 77b (see FIG. 5A), which keeps the pin from rotating in the shaft. At its lower end, the pin 77, has its terminal end 77c cut at about a 45° incline to the axis to form a ratchet head. The ratchet head 77c protrudes slightly beyond the end of the cylindrical housing 75 against the compression of spring 77d.

Ratchet head 77c, which is designed to function as a ratchet with the slots 73a in a manner to be described, can be reversed in direction to serve as a noise maker, or disengaged from the slots 73a by flipping the control handle 77a. In an alternative arrangement, an additional reverse spring-loaded pin cab be positioned to operate as a noise maker.

When the hollow drive shaft 73, integral with circular plate 49, is inserted axially into the central opening in the left-hand face plate 5c of gear box 5, which is held in concentric relation with the lateral bore in leg 6a of housing 6, then ratchet head 77c is in position to engage the slots 73a of the hollow drive shaft 73. Ratchet head 77c is constructed to engage slots 73a in each of the three rotatable positions of the reel about the shank 12. When the reel is engaged in positions 13a and 13c, which are 180° apart, for left-handed or right-handed reel winding, the broad inclined surface of 77c is, in each case, parallel to and designed to engage the wide edges of the slots 73a as a ratchet. When the reel is engaged in the position 13a, the inclined surface of the ratchet head 77c is so disposed that the hollow drive shaft 73 (and frictionally coupled spindle shaft 26) can only rotate in a clockwise direction; whereas in position 13c, the reel is turned 180° relative to the inclined ratchet face so that hollow drive shaft 73 (and frictionally coupled shaft 26) can rotate only in a counterclockwise direction. In position 13b, which is halfway between 13a and 13c in angular rotation, the inclined ratchet surface 77c is turned through 90° from the long edges of the oblong slots 73a, so that the angularly projecting end 77c engages and keys into one of the slots, locking hollow drive shaft 73 (and hence, shaft 26) against rotation, as is required for the spin casting position.

Referring now to FIG. 6 of the drawings, there is shown the spool assembly. This comprises a level wind 7, as previously described, having a narrow edge flange 7b which is directed outwardly in the manner of a cup, normal to the circular base plate 7c, to keep the line from getting in back of the spool. An internal annular base plate 85, having a central opening 86, is riveted or otherwise secured in concentric relation to the outwardly directed face of level wind 7. As previously described, level wind 7 is equipped with a taper flange or wire 9, fastened on one side by screws 9a, 9b, which serves to level wind the string on the spool during the winding operation.

Referring back to FIG. 2, which shows the bottom or inwardly directed face of level wind base 7c, there is shown a central inwardly directed hub 14 which extends along the axis toward the outer face of the housing leg 6a, and is held in fixed position on hollow drive shaft 73 by a set screw 14a. The hub 14 has a bore 87 concentric with and slightly smaller than the opening 86 in the inside face plate, the latter being designed as a clearance for the annular flange 91a at the right-hand end of spindle 91.

Assuming that the spindle shaft 26 has been assembled in the gear housing 5, and in the main housing 6 together with the hollow drive shaft 73, the elements of the spool assembly shown in FIG. 6 are threaded onto the shaft in the order shown from right to left in the drawing. At the left-hand end of spindle 91 is a spacer 92, of equal diameter. Coil spring 93 fits over spindle 91, and bears against flange 91a. On top of the spring is placed a lock washer 94 having a pair of diametrically extended keys. These elements are bolted fast to the threaded end of spindle shaft 26 by the nut 10. It will be understood that these elements can take other forms than specifically shown. For example, the shaft 26, spindle 91 and lock nut 94 can all be formed in one piece.

The spool 8, constructed to support the fishing line, has a central opening with two diametrically opposite pairs of rectangularly cut keyways 95a and 95b. Keyways 95a, which project through the hole, are designed to accommodate the projections on key 94. The spool is then depressed against the spring-loaded spindle, and rotated through 90° to lock it in position in the shallow keyways 95b. Thus, the spool 8 is tacked fast to spindle 91 for rotation with the spindle shaft 26.

Figure 7:
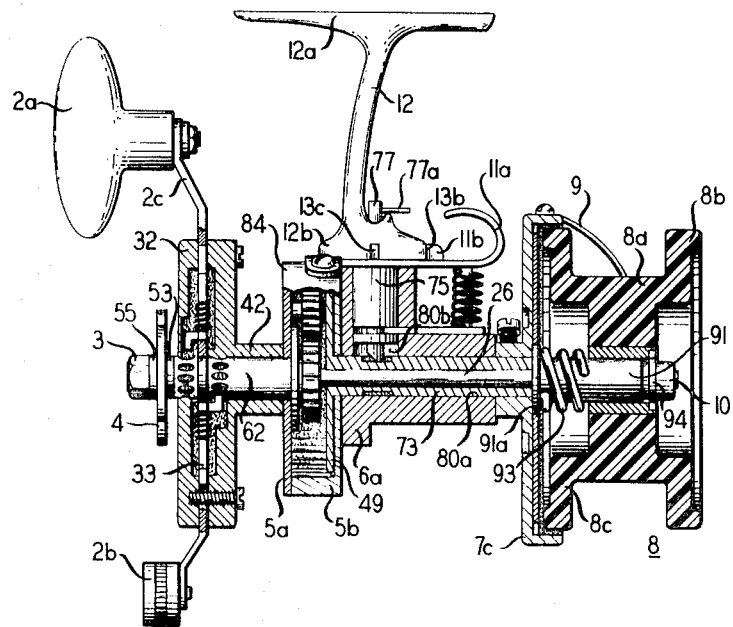
FIG. 7 is a longitudinal sectional view along the line 7—7 of FIG. 1.

FIG. 7 shows a sectional view of the reel of the present invention completely assembled with the spool 8 locked into engagement with spindle 91, the reel being turned relative to the shank 12 so that the notch 13b is in engagement with the notch 11b, putting the reel in position for spin casting. In this condition, hollow drive shaft 73 is locked against rotation, as the long end of ratchet head 77c engages one of slots 73c. If drag nut 4 is loosened so as to release the frictional clutch between shaft 26 and the gear mechanism, the reel is conditioned for free spool operation as in spool or bait casting.

SUMMARY OF OPERATION

I. When drag nut 4 is loosened, the reel is conditioned for free spool rotation of the spindle shaft 26, independently of hollow drive shaft 73, in any of the three orientations relative to shank 12.

II. When the drag nut 4 is tightened to provide a frictional clutching action, so that the spindle shaft 26 rotates in concert with the hollow drive shaft 73, the following conditions obtain:

a. When the reel is rotated on shank 12 in positions 13b for spin casting:

Hollow drive shaft 73 (coupled to shaft 26) is fixed against rotation by action of ratchet detent 77c.

b., c. When the reel is rotated on shank 12 to either of positions 13a or 13c for right-handed or left-handed spool winding:

Hollow drive shaft 73 (coupled to spindle shaft 26) rotates in a clockwise or counterclockwise direction, respectively, rotating level wind 7 to keep the line in order, and making a clicking noise due to the ratchet action of 77c.

1. If handle 2c is shifted for low speed operation, then pin 34a engages slots 50a of collar 50. The latter is friction-coupled to pinion gear 65 by means of pressure sleeves 61 and 69, gear 65 being friction-coupled to shaft 26 through flange 26a. Thus, one turn of the crank 2 causes one turn of spindle shaft 26. This creates a direct drive between crank 2 and spindle 91.

2. If the handle 2c is shifted for high speed operation, then pin 33a engages slots 62a of hollow drive shaft 62. One rotation of the handle attached directly to hollow drive shaft 62 causes one rotation of combined hollow drive shafts 62 and 73, causing idler gear 66 to make one cycle around the inside of ring gear 69, while pinion gear 65 and spindle shaft 26 make three rotations, plus an additional rotation added above that afforded by the gear ratio, because of the rotation of the whole gear assembly.

III. A noise maker may be provided by flipping control handle 77a, reversing the ratchet head 77c through 180° in contact with the slots 73a. Alternatively, the ratchet head may be disconnected by lifting it out of contact with slots 73a; or a separate ratchet head which meshes in contact with slots 73a during the noise making operation only may be provided.

a. Spool drag works with the drag nut 4 slightly tightened to control the tension on the line, operation being similar to free spool operation except for the increased tension.

b. Twisting of the line is avoided by spin casting in position 13b, first a right-hand cork screw and then a left-hand cork screw, or vice versa.

It will be understood that the invention is not limited to the specific forms or components shown and described by way of illustration, but is limited only by the scope of the appended claims.

What is claimed is:

1. A reel for use in conjunction with a fishing rod which comprises in combination:

a spool for fishing line, means comprising a spindle for supporting said spool for rotation, a spindle drive shaft designed to extend in axial relation to said reel including said spindle and coupled to drive said spindle in rotation, said spindle drive shaft surrounded concentrically along at least a part of its length by a hollow drive shaft coupled to be engaged for rotation with said spindle drive shaft, a support member for binding said reel to said fishing rod, said support member including a shank substantially normal to said drive shafts and serving as an axis for rotation of said reel including said drive shafts to assume at least two different positions 90° apart, wherein in one said position said drive shafts are disposed substantially parallel to the long direction of said fishing rod for spin casting, and in another said position said drive shafts are disposed substantially normal to the long direction of said rod for spool casting and spool winding, locking means projecting from said shank which is constructed to key into and lock said hollow drive shaft, coupled with said spindle drive shaft, against rotation when said reel is in said one position, and to release said drive shafts for rotation when said reel is in the other said position, a crank having a handle for manual rotation, and driving means for coupling said crank to rotate at least one of said drive shafts for driving said spindle to rotate.

2. A fishing reel in accordance with claim 1 comprising means including a drag nut for coupling said hollow shaft for rotation with said spindle shaft, or for decoupling said hollow shaft from said spindle shaft for independent free spool rotation.

3. The combination in accordance with claim 1 wherein said locking means comprises:

a ratchet head projecting downwardly from the lower end of said shank, said hollow drive shaft having a series of slots spaced apart in a circular arrangement around its circumference, said ratchet head disposed to engage one of the slots in said hollow drive shaft, in said one position for spin casting, said ratchet head constructed to form a detent which locks against a lateral edge of said slot for preventing axial rotation of said hollow drive shaft, and in said other spool casting and spool winding position said ratchet head presenting an inclined face to the lateral edges of said slots so that said hollow drive shaft is rotatable in one direction only.

4. The combination in accordance with claim 3 wherein said shank serves as an axis for rotation of said reel including said drive shafts through an arc of approximately 180° to each of three different positions wherein said spin casting positions is disposed midway between the other two terminal right-hand and left-hand positions for spool casting and spool winding, and wherein in said midway position for spin casting said ratchet head forms a detent which locks against a lateral edge of said slot for preventing axial rotation of said hollow drive shaft, and wherein in each of said respective right-hand and left-hand terminal spool casting and winding positions which are diametrically opposed, said ratchet head presents an inclined face disposed to contact the lateral edges of said slots in succession in a clockwise or counterclockwise direction of rotation, respectively, so that said sleeve rotates in one direction only.

5. The combination in accordance with claim 4 wherein said ratchet head comprises a spring-loaded shaft terminating in a control handle remote from said ratchet head, whereby said ratchet head is constructed to be withdrawn from contact with said slots and alternatively disconnected, or reversed in direction relative to said slots.

6. A combination in accordance with claim 1 wherein said driving means comprises:
 a first means including a pressure sleeve surrounding said spindle shaft for coupling said crank means to drive said spindle in low speed rotation,
 a second means including a lateral extension of said hollow drive shaft concentric with and enclosing said pressure sleeve and independently rotatable with respect to said pressure sleeve for coupling said crank to drive said hollow drive shaft in rotation,
 a system of gears constructed to be actuated by said hollow drive shaft to drive said spindle in high speed rotation,
 and manually operable means attached to the handle of said crank for shifting from said first means to said second means.

7. The combination in accordance with claim 6 wherein
 said first means comprises a slotted collar,
 and said second means included said lateral extension of said hollow drive shaft is slotted to match the slots of said collar, said lateral extension being coaxial with said collar and having its end slightly spaced apart from said collar,
 said manually operable means attached to said crank handle comprising a pair of oppositely directed detents, one said detent constructed to engage the slots of said collar, and the other said detent constructed to engage the slots in said lateral extension.

8. The combination in accordance with claim 7 wherein
 said hollow drive shaft and the lateral extension of said hollow drive shaft are formed to include between them a pair of substantially matching annular flanges in a plane substantially normal to the axes of said shafts, said flanges forming a secondary gear box having axial bores accommodating said spindle shaft, and enclosing said system of gears disposed in driving relation between said hollow drive shaft and said spindle shaft.

9. The combination in accordance with claim 8 wherein the gears of said system include:
 a pinion gear disposed in concentric relation to said spindle shaft and constructed to rotate in frictional engagement therewith,
 a ring gear fixed in relation to the housing in which said drive shafts are mounted for rotation, said ring gear comprising a ring of inwardly directed teeth concentric with said pinion gear and said shaft,
 at least one idler gear mounted on an inwardly directed eccentric pin connected to an inner face of said secondary gear box, said idler engaged to traverse the ring of teeth on said ring gear and to simultaneously engage the teeth of said pinion gear in rotation, the number of teeth of said ring gear substantially exceeding the number of teeth of said pinion gear and of said idler gear whereby said pinion gear executes at least several rotations while said idler gear executes a single traverse around the teeth of said ring gear,
 wherein in low speed rotation said pressure sleeve is frictionally engaged to rotate said pinion gear which is frictionally coupled to said spindle shaft, and
 in high speed rotation said hollow drive shaft is connected through said secondary gear box to drive said idler gear to traverse the teeth of said ring gear, which cooperates with said spur gear so that the latter executes a plurality of rotations while said idler gear makes a single traverse around the teeth of said ring gear.

10. The combination in accordance with claim 1 comprising a quick change reversible spool,
 said spool constructed with substantially symmetrical right-hand and left-hand ends and having an axial bore including a pair of diametrically opposite keyways extended through the length of said bore,
 a spool lock comprising a lock washer secured near the end of said spindle against the compression of a spring, said lock washer including a pair of oppositely directed projecting keys constructed to pass through said keyways in one orientation of said spool, and to lock said spool on said spindle in another orientation of said spool.

11. The combination in accordance with claim 10 comprising a level wind mechanism mounted coaxially with said spindle and connected in driven relation with said hollow drive shaft, said level wind including a tapered flange member for regulating the winding of the line on said spool.

* * * * *